United States Patent Office 2,796,326
Patented June 18, 1957

2,796,326

PROCESS FOR MAKING ETA ALUMINA FROM ALUMINUM ALCOHOLATES

Charles N. Kimberlin, Jr., and Elroy M. Gladrow, Baton Rouge, La., assignors to Esso Research and Engineering Company, a corporation of Delaware No Drawing. Application February 9, 1954,
Serial No. 409,258

9 Claims. (Cl. 23—143)

This invention relates to the preparation of improved solid catalysts for the conversion of hydrocarbon materials. More particularly, it relates to the improved preparation of eta alumina, an exceedingly effective support material for catalysts, especially platinum-containing hydroforming catalysts.

Recent developments in the petroleum refining industry have concentrated attention upon methods for the conversion of low boiling feed stocks, particularly those in the middle and heavy portions of the naphtha boiling range, into products of improved octane number. Considerable success along these lines has been obtained by the process known as hydroforming. In this process the hydrocarbon feed stock is treated at operating temperatures of about 700°–1100° F., in the presence of a catalyst of suitable activity and in a hydrogen-containing atmosphere at such pressure that the hydrocarbon transformation reactions taking place result in a net production of hydrogen. A variety of reactions are involved, which include dehydrogenation, paraffin and naphthene isomerization, cyclization, or aromatization. All of these result together in producing a product of markedly improved motor fuel value as determined by octane rating.

The operating conditions of the hydroforming operation are pressures in the range of 50 to 1000 p. s. i. g., usually 100 to 700 p. s. i. g., and temperatures in the range of 700°–1100° F., usually 875°–950° F. The hydrogen dilution may vary from about 1000 to 10,000 C. F./B.

The feed or charging stock to the hydroforming reactor can be a virgin naphtha, a cracked naphtha, a Fischer-Tropsch naphtha, mixtures of these, or the like. The feed stock is preheated alone or in admixture with recycle gas to reaction temperature or to the maximum temperature possible while avoiding thermal degradation of the feed stock.

A particularly useful catalyst for these operations has been found to be platinum supported on an alumina base. For instance, a commonly used composition of such catalyst is one containing from 0.001 to 2.0 weight percent platinum, the remainder being the alumina spacing agent or base.

A particularly suitable form of alumina for use as a support material has been prepared according to the process of U. S. Patent No. 2,636,865. This process comprises reacting aluminum metal with a water-insoluble anhydrous alcohol, hydrolyzing the aluminum alcoholate, separating the hydrous alumina from the alcohol, and recovering the alumina from its aqueous slurry. The hydrolysis temperature utilized is in the range of 70°–200° F. and supplies an effective catalyst support. The hydrous alumina produced thereby comprises a mixture of alpha monohydrate and beta trihydrate. This mixture yields varying amounts of eta alumina after activation, with the remainder in the gamma form. The relative amounts of eta and gamma alumina present in the activated alumina depend on the respective amounts of beta trihydrate and alpha monohydrate in the hydrous alumina. Experiments have now demonstrated that catalyst activity and activity maintenance are improved as the eta alumina content of the support is increased. This improvement is effected without impairing the selectivity to $C_5+$ product. It is therefore desirable to obtain alumina support materials consisting predominantly, i. e., at least 80 weight percent, or essentially of eta alumina.

It has now been found that eta alumina can be formed in quantitative yields, 100% if desired, by controlling in combination the water hydrolysis of aluminum alcoholate in terms of the amount of water utilized, the temperature of the hydrolysis, and the time of aging, i. e., the time the hydrous alumina is maintained in the aqueous slurry before dehydration. By controlling in combination all these factors, a hydrous alumina is formed which yields the alumina of the aforementioned eta content on heating. The eta alumina can then be admixed with other catalyst components by means known to the art.

Metallic aluminum is first reacted with an alcohol to form aluminum alcoholate. Sufficient aluminum is reacted to give a solution comprising about 5% to 15% aluminum alcoholate. For the present process the alcohol must be essentially anhydrous. Alcohols that can be used in this process include ethyl, propyl, isopropyl, n-butyl alcohol, secondary butyl alcohol, isobutyl alcohol, pentanol-1, pentanol-2, 3-methyl butanol-1, 2-methyl butanol-3, pentanol-3, hexanol-1, hexanol-2, hexanol-3, the various methyl pentanols, the various dimethyl butanols, the various heptyl alcohols, the various octyl alcohols, etc., including those higher alcohols liquid at the temperature of operation of the process. Instead of using any one of the alcohols singly, mixed alcohols such as mixed amyl alcohols may be used. Mixtures of alcohols of different molecular weights can also be used.

In general, it is preferred to utilize water-immiscible alcohols, i. e., $C_5$ and higher, since this facilitates the recovery of the alcohol in anhydrous form for reuse in the preparation of aluminum alcoholate. In order to further facilitate the separation of the alcohol from the water when using a water-insoluble alcohol, a hydrocarbon, such as a petroleum distillate boiling within the range of 200°–500° F. or higher, preferably of narrow boiling range which includes the boiling range of the alcohol used, may be added to the alcohol. Instead of using a hydrocarbon fraction, selected hydrocarbons such as heptane, octane, toluene, xylene, etc., may be used. Although such addition of the hydrocarbon is not essential to the process, the use of the hydrocarbon diluent has the following advantages:

(1) The diluent aids in controlling the reaction of the alcohol and aluminum metal since a large amount of heat is liberated in the reaction and the hydrocarbon diluent aids in the dissipation of this heat;

(2) The hydrocarbon serves as a solvent for the solid aluminum alcoholate; and (3) The hydrocarbon diluent greatly aids in the separation and recovery of the alcohol from the slurry after hydrolysis.

The metallic aluminum in the form of chips, shot, turnings, ingots or the like is reacted with the alcohol, preferably in the presence of a hydrocarbon diluent and in the presence of a suitable catalyst such as mercuric chloride or other mercury salts, iodine, aluminum halides, or the like. The formation of the alcoholate takes place in accordance with the following equation:

EQUATION 1

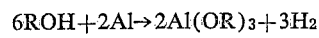

The hydrogen is in the gaseous state and escapes from the reaction mixture.

The aluminum alcoholate is then hydrolyzed with good agitation in a large excess of water at temperatures of about 32°–70° F. About 1–10 volumes or more of water are used per volume of aluminum alcoholate solution. It is preferred that about 7–10 volumes or more of water per volume of aluminum alcoholate solutions are present in the immediate mixing zone. More concentrated alumina slurries are obtained by recycling the dilute aqueous slurry to the mixing zone where it is contacted with fresh aluminum alcoholate. The hydrous alumina slurry is aged while contained in the water layer for a period of from 20–65 hours or longer at ambient temperatures. In general, hydrolyzing and aging at the upper end of the preferred temperature range will make desirable the shorter end of the aging period and lower end of the water/alcoholate ranges.

The aluminum alcoholate solution may be added slowly to the water or, preferably, the alcoholate and water may be fed simultaneously and at controlled rates through separate lines to a mixing zone.

When using water-insoluble alcohols, the alcohol which is reformed or regenerated by the hydrolysis step together with the hydrocarbon diluent forms a layer separate and distinct from the slurry of hydrous aluminum oxide and is easily recovered and removed by a simple process of decanting or the like.

When using water-soluble alcohol for reacting with aluminum to form the alcoholate, the alcohol reformed upon hydrolysis of the alcoholate goes into solution in the water and can be recovered by distillation. The recovered alcohol must then be dehydrated to anhydrous form in known manner before it is again used for reaction with additional metallic aluminum.

The alumina slurry after aging, in which the alumina is in the beta trihydrate form, is then preferably first dried at a temperature in the range of 200°–250° F. to remove the aqueous medium in which it is contained. Eta alumina is formed by further dehydrating the beta alumina trihydrate (Bayerite) generally in the presence of air. It has been found that this conversion is essentially quantitative when the activating temperature is in the range of 400°–1250° F., preferably 650°–1200° F. Because of the aforementioned transformation of beta trihydrate to eta alumina, this can also be used to indicate the amount of eta phase in the alumina made by activating the product of the hydrolysis.

This calcination or activation treatment can alternatively follow the addition of the catalyst component where the combined catalyst is heated in the same temperature range. This is explained in further detail below. In a similar manner the dehydrogenation or active catalytic component can be added to the base either before or after the latter is dried.

The eta alumina can be converted into a hydroforming catalyst by the addition of molybdenum oxide, vanadium oxide, tungsten oxide or chromium oxide, or metallic salts of molybdic acid such as calcium molybdate or cobalt molybdate or preferably precious metals such as platinum or palladium. The incorporation of the catalytic component can be effected in any of a variety of ways well known to the art. For example, molybdenum oxide can be incorporated by slurrying molybdenum oxide with the hydrous alumina or the latter may be dried and the molydenum oxide sublimed thereon. Alternatively the molybdenum oxide may be incorporated by treating the alumina with ammonium molybdate.

The amount of catalytic component added can be varied, depending to a large degree upon the particular material used. For the most part the catalytic metal oxides or metallic salts of molybdic acid are applied in sufficient amount to give from about 5 to 20 weight percent of the said component in the final composite, although in the case of chromium oxide as much as 40 weight percent may be incorporated. In the case of the precious metal catalysts about 0.001 to 2.0 weight percent of platinum or about 0.5 to 5.0 weight percent of palladium will suffice to give a catalyst of the desired activity. The dehydrogenating or active catalytic component can be added to the base either before or after the latter is dried, as explained before. It is ordinarily preferred to subject the catalyst to a calcination treatment or heating to temperatures of up to about 1200° F. prior to use in a reforming or hydroforming process.

Because of the marked superiority of eta alumina as a support for platinum catalysts, more detailed information is supplied on the preparation of these materials.

The platinum is impregnated on the alumina support by means known in the art. One of the better means involves treatment of the alumina support with aqueous solutions of water-soluble inorganic platinum-containing compounds. The term "water-soluble" also includes platinum-containing compounds which form colloidal solutions. Typical of the water-soluble inorganic platinum-containing compounds are chloro-platinic acid, potassium platinum chloride, platinum disulphide, tetrammino platino chloride, potassium platinonitrite, dichloro diammino platinum, ammonium platino-nitrite, and dinitrito-diammino-platinum. A conveniently used aqueous platinum solution is one containing 15 grams of $H_2PtCl_6 \cdot xH_2O$ (40% Pt) per liter. This strength can be employed to yield catalysts containing about 0.5% platinum; lower or higher concentrations are employed when it is desired to alter the platinum content of the final catalyst. The gross amount of solution utilized is preferably that required to impregnate with the desired amount of platinum by just wetting the total alumina. The alumina support in the platinum solution is heated to dryness, conveniently at temperatures of about 200°–600° F. at atmospheric pressure, which results in removal of a substantial portion of the water.

The final step in the preparation involves the subjection of the dried catalyst to a reduction step. This reducing step can be carried out by means known in the art, such as hydrogenation and treatment with chemical reducing agents. Typical of these reduction operations is treatment with hydrogen at 200°–1000° F. with hydrogenation pressures of atmospheric to 1000 pounds p. s. i. g. The catalyst may be calcined after the drying step. Calcining can be carried out at temperatures of the order of about 1100° F., e. g., 800°–1250° F. Both types of operations are preferably carried out slowly, for example, over the course of about 4 to 24 hours.

It has also been found desirable to treat the catalyst, either before, after, or during impregnation of the active catalytic component, with an aqueous dilute combined acid solution, i. e., an oxidizing acid such as $HNO_3$, perchloric acid, or hypochlorous acid, together with a hydrogen halide such as HCl, HF, HI, and HBr. $HNO_3$ and HCl are preferred. It has been found that 0.1 to 8 weight percent nitric acid based on the total catalyst and 50–500 weight percent water is suitable. It is preferred to employ a dilute solution which is about 0.01 molal to 2.5 molal $HNO_3$.

The HCl is employed in an amount of about 1 to 30 weight percent based on the catalyst. This acid is contained in from 50 to 500 weight percent water based on the supported catalyst. These concentrations of acid do not dissolve the support appreciably. It is preferred to use solutions which are from 0.1 molal to about 3 molal HCl.

In acid treating, the calcined catalyst is contacted with the acid, then the acid is drained off and the catalyst is washed thoroughly with distilled water, and then it is dried at 250° F. and recalcined for 1 to 4 hours at 1100° F. in the case of Pt catalysts.

It is also advantageous to treat the fresh catalyst with gaseous halogen, e. g., chlorine in an amount of from 0.1 to 10 weight percent on catalyst and preferably 1 to 3 weight percent.

This invention will be better understood by reference to the following examples of the preparation and the advantages of the catalyst of this invention.

Example 1

An aqueous slurry of hydrated alumina is prepared from aluminum alcoholate as follows. Fifty-four pounds of aluminum metal in the form of turnings are dissolved in about 124 gallons of a 50/50 mixture of mixed amyl alcohols and petroleum naphtha boiling in the range of about 200° to 300° F. About 1/10 ounce of mercuric chloride is used as a catalyst for the reaction between the aluminum and the amyl alcohol. It is necessary to heat the mixture to start the reaction between the metal and the alcohol, but after the reaction is started cooling is necessary. After the reaction is complete the solution of aluminum amylate is hydrolyzed with water in the following manner. The aluminum alcoholate at 65° F. is fed at a rate of 8 gallons per hour into the impellor zone of a centrifugal pump where it is contacted with water at 65° F. fed through a separate line at a rate of 240 gallons per hour. The dilute aqueous slurry of alumina is recycled such that the composition of the final slurry is about 3% solids. The alcohol/hydrocarbon phase is decanted and rejected.

Separate samples of the hydrous alumina slurry are aged at 65°–70° F. for various times and oven dried at 250° F. The beta trihydrate content of these aluminas as a function of aging time is as follows:

| Aging time, hrs.: | Percent beta trihydrate |
|---|---|
| 2 | 10 |
| 20 | 50 |
| 65 | 100 |
| 168 | 100 |

A portion of the 100% beta trihydrate material is converted to eta alumina by calcining at 1100° F. for 4 hours. Ten pounds of this alumina are impregnated with 1.2 gallons of a solution comprising 1.51 ounces (troy) of platinum chloride ($PtCl_4$). The catalyst is left at room temperature for 16 hours, and then dried at 250° F. The catalyst is converted into 3/16 inch by 3/16 inch cylindrical pellets and heated 4 hours at 1000° F. This catalyst, which comprises 0.6% Pt is designated catalyst "A."

Example 2

Fifty-four pounds of aluminum are converted into aluminum alcoholate as described in Example 1. The aluminum alcoholate solution at 65°–70° F. is fed at a rate of 25 gallons per hour into the impellor zone of a centrifugal pump where it is contacted with a 10% water–90% amyl alcohol solution at 65°–70° F. being fed at a rate of 25 gallons per hour. The slurry is then diluted with an equal volume of water, and the alcohol-hydrocarbon layer rejected. The aqueous alumina slurry is aged 40 hours at room temperature and dried in an oven at 250° F. This material exhibited less than 5% beta trihydrate. This result coupled with the results shown in Example 1 demonstrates the importance of utilizing a large excess of water in the hydrolysis zone to effect a high yield of beta alumina trihydrate.

Example 3

Fifty-four pounds of aluminum metal are converted into aluminum alcoholate as described in Example 1. The aluminum alcoholate is heated to 140° F. and fed at a rate of 8 gallons per hour into the impellor zone of a centrifugal pump where it is contacted with water heated to about 190° F. fed at a rate of 240 gallons per hour. The dilute aqueous slurry of alumina is recycled such that the composition of the final alumina slurry is about 3% solids. The alcohol-hydrocarbon is decanted and rejected.

The alumina slurry is dried in an oven at 250° F. The crystal form of the alumina as determined by X-ray analysis shows about 95% alpha monohydrate and about 5% beta trihydrate. A portion of this material was calcined at 1100° F. for 4 hours. Ten pounds of the calcined alumina are impergnated with 1.2 gallons of a solution comprising 1.51 ounces (troy) of platinum chloride ($PtCl_4$). The catalyst is left at room temperature for 16 hours, and then dried at 250° F. The catalyst is converted into 3/16 inch by 3/16 inch cylindrical pellets and heated 4 hours at 1000° F. This catalyst which comprises 0.6% Pt is designated catalyst "B."

Example 4

Catalyst "A" and "B," described in Examples 1 and 3, respectively, are employed in a fixed catalyst bed operation for the hydroforming of a 200° F. to 330° F. boiling range virgin naphtha from mixed coastal crudes. The conditions employed are 900° F. temperature, 200 p. s. i. g. pressure, and 5000 cubic feet of added hydrogen per barrel of naphtha feed. The relative activities of these catalysts, as measured by the weight of naphtha fed per hour per weight of catalysts charge (w./hr./w.) necessary to give 95 research octane number (clear), and the yields of $C_5+$ gasoline product at this octane number are shown in the tabulation.

| Catalyst | At 95 Res. Oct. No. | |
|---|---|---|
|  | W./Hr./W. | Vol. Percent $C_5+$ |
| "A" | 2.7 | 85 |
| "B" | 1.8 | 83 |

These data demonstrate how activity correlates positively with eta alumina content.

The catalysts of this invention are adapted for use in hydroforming, hydrogenation, hydrocracking, cracking, oxidation, and other reactions known to those in the art. These catalysts are especially useful for the production of aromatics from naphthenes and for the cyclization-dehydrogenation of paraffins and olefins.

The method of this invention is applicable to the preparation of pilled, powdered, pelleted, extruded, etc., catalysts. It is applicable to impregnated, coprecipitated, or dry mix catalysts.

The specific names of the crystal modifications of alumina and the alumina hydrates now commonly accepted in the literature and used here are described in detail in an article by H. C. Stumpf et al. of the Aluminum Company of America, in Industrial and Engineering Chemistry, volume 42, page 1398, July 1950.

It is to be understood that this invention is not limited to the specific examples, which have been offered merely as illustrations, and that modifications may be made without departing from the spirit of the invention.

What is claimed is:

1. In the preparation of an alumina especially adapted for use as a catalyst support and consisting predominantly of eta alumina, the improvement which comprises hydrolyzing an aluminum alcoholate with water at a temperature in the range of 32–70° F., the amount of water utilized being in the range of 1–10 volumes of water per volume of alcoholate; aging the resulting alumina precipitate contained as an aqueous slurry of hydrous alumina for a period of time in the range of 20 to 65 hours; drying the slurry to remove the aqueous medium and recovering alumina consisting predominantly of beta trihydrate, said conditions of alumina preparation being critically selected with respect to each other within said ranges whereby on subsequent heating in the range of 650 to 1200° F. predominantly eta alumina is obtainable.

2. In the preparation of an alumina especially adapted for preparation of catalysts, the improvement which comprises hydrolyzing an aluminum alcoholate with water at a temperature below about 70° F., the amount of water utilized being in the range of about 7 to 10 volumes of water per volume of alcoholate, and thereafter aging the resulting alumina precipitate contained as an aqueous slurry of hydrous alumina for at least about 65 hours, said conditions of alumina preparation being critically selected with respect to each other within the said ranges whereby substantially pure beta trihydrate is obtained.

3. The process of claim 1 in which the aluminum alcoholate is derived from a $C_5$ and higher alcohol.

4. The method of preparing an alumina especially adapted for use as a catalyst support and consisting predominantly of eta alumina which comprises the steps of hydrolyzing an aluminum alcoholate with water at a temperature in the range of 32°–70° F., the amount of water utilized being in the range of 1–10 volumes of water per volume of alcoholate; aging the resulting alumina precipitate contained as an aqueous slurry of hydrous alumina for a period of time in the range of 20 to 65 hours, drying the slurry to remove the aqueous medium and recover the alumina; and heating the alumina to a temperature in the range of 400°–1250° F. to further dehydrate it, said conditions of catalyst preparation being critically selected with respect to each other within the said ranges whereby substantially pure eta alumina is obtained.

5. The process of claim 4 in which the aluminum alcoholate is derived from a $C_5$ and higher alcohol.

6. The method of preparing an alumina especially adapted for use as a catalyst support and consisting of eta alumina which comprises the steps of hydrolyzing aluminum amylate with water by adding the amylate to the water at a temperature of 35° F., the amount of water utilized being in the amount of 1 to 10 volumes of water per volume of amylate; aging the resultant precipitate contained as an aqueous slurry of hydrous alumina for 40 hours at ambient temperature; drying the slurry to remove the aqueous medium and recover the alumina principally as beta alumina trihydrate and heating the alumina to a temperature of 1100° F. to further dehydrate it.

7. The method of preparing an improved catalyst which comprises the steps of hydrolyzing an aluminum alcoholate with water at a temperature in the range of 32°–70° F., the amount of water utilized being in the range of 1–10 volumes of water per volume of alcoholate; aging the resulting alumina precipitate contained as an aqueous slurry of hydrous alumina for a period of time in the range of 20 to 65 hours; drying the slurry to remove the aqueous medium and recover the alumina; and heating the alumina to a temperature in the range of 400°–1250° F. to further dehydrate it, said conditions of catalyst preparation being critically selected with respect to each other within the said ranges whereby substantially pure eta alumina is obtained and thereafter incorporating an active catalytic component with the eta alumina.

8. The method of claim 7 in which the said active catalytic component is platinum.

9. The method defined by claim 4 in which the said aging period is about 40 hours.

References Cited in the file of this patent

UNITED STATES PATENTS

| | | |
|---|---|---|
| 2,247,624 | Wall | July 1, 1941 |
| 2,406,420 | Weiser et al. | Aug. 27, 1946 |
| 2,579,251 | Coates et al. | Dec. 18, 1951 |
| 2,636,865 | Kimberlin | Apr. 28, 1953 |
| 2,663,620 | Haensel | Dec. 22, 1953 |

FOREIGN PATENTS

| | | |
|---|---|---|
| 667,145 | Great Britain | Feb. 27, 1952 |